United States Patent [19]
Stegmueller et al.

[11] Patent Number: 5,195,150
[45] Date of Patent: Mar. 16, 1993

[54] OPTOELECTRONIC DEVICE FOR OUTFEED AND INFEED OF RADIATION

[75] Inventors: Bernhard Stegmueller, Augsburg; Gerhard Franz, Munich; Jochen Heinen, Haar, all of Fed. Rep. of Germany

[73] Assignee: Siemens Aktiengesellschaft, Munich, Fed. Rep. of Germany

[21] Appl. No.: 826,433

[22] Filed: Jan. 27, 1992

[30] Foreign Application Priority Data

Feb. 8, 1991 [DE] Fed. Rep. of Germany ....... 4103930

[51] Int. Cl.$^5$ .............................................. G02B 6/00
[52] U.S. Cl. ..................................................... 385/33
[58] Field of Search .................................... 385/32–36

[56] References Cited

U.S. PATENT DOCUMENTS

| | | | |
|---|---|---|---|
| 3,967,877 | 7/1976 | Heidrich et al. | 385/33 |
| 4,163,953 | 8/1979 | Springthorpe et al. | 331/94.5 |

FOREIGN PATENT DOCUMENTS

| | | |
|---|---|---|
| 40726/85 | 10/1985 | Australia . |
| 0164834 | 12/1985 | European Pat. Off. . |
| 2529073C2 | 3/1983 | Fed. Rep. of Germany . |
| 3413704 | 10/1985 | Fed. Rep. of Germany . |
| 3914835C1 | 7/1990 | Fed. Rep. of Germany . |

OTHER PUBLICATIONS

Liau et al., "GaInAsP/InP buried-heterostructure surface-emitting diode laser with monolithic integrated bifocal microlens", *Appl. Phys. Letter*, vol. 56, No. 13, Apr. 26, 1990, pp. 1219–1221.

Liau et al, "Surface-emitting GaInAsP/InP laser with low threshold current and high efficiency", *Appl. Phys. Lett.*, vol. 46, No. 2, Jan. 15, 1985, pp. 115–117.

Walpole, "R & D on Surface-Emitting Diode Lasers", *Laser Focus/Electro-Optics*, Sep. 1987, pp. 66–74.

Saito et al, "A Reflection-Type Surface-Emitting 1.3 μm InGaAsP/InP Laser Array with Microcoated Reflector", *Japanese Journal of Applied Physics*, vol. 28, No. 7, Jul. 1989, pp. L1239–L1241.

Mihara, "New Surface-Emitting Laser Diode Connects to Optical Fiber Directly", *JEE, Hi-Tech Report*, Jun. 1989, pp. 74–77.

Donnelly et al, "Hybrid approach to two-dimensional surface-emitting diode laser arrays", *Appl. Phys. Lett.*, vol. 53, No. 11, Sep. 12, 1988, pp. 938–940.

Iga et al, "Surface Emitting Semiconductor Lasers", *IEEE Journal of Quantum Electronics*, vol. 24, No. 9, Sep. 1988, pp. 1845–1855.

Archey et al, "Low Loss Optical Coupler", *IBM Technical Disclosure Bulletin*, vol. 22, No. 12, May 1980, pp. 5288–5290.

*Primary Examiner*—Akm E. Ullah
*Attorney, Agent, or Firm*—Hill, Steadman & Simpson

[57] ABSTRACT

An optoelectronic device for outfeed and infeed of radiation into and out of a waveguide having the waveguide disposed on a substrate and provided with a mirror for reflecting the light through the substrate. The device includes at least a plano-convex lens being integrated on a surface of the substrate lying opposite the waveguide. In one embodiment, a second substrate is secured on the first substrate and one of the substrates has a recess for receiving the lens and the second substrate can have a recess aligned with the lens for receiving an end of an optical fiber.

20 Claims, 2 Drawing Sheets

OPTOELECTRONIC DEVICE FOR OUTFEED AND INFEED OF RADIATION

BACKGROUND OF THE INVENTION

The present invention is directed to an optical electrical device or component for outfeed and infeed of radiation which is guided in a waveguide.

Light is used in optoelectronic devices (OED) either as a signal carrier or as an energy carrier. In order to exchange signals or, respectively, to exchange energy between various elements, the light must be transported. A coupling between a transmitter and a receiver is needed for this purpose. This can occur either via waveguides, such as optical fibers, or through space, which does not require any waveguides. In each instance, however, light must be outfed from or, respectively, infed into the electronic component.

The coupling of radiation through the substrate is possible in OEDs when the substrate is transparent for the emitted light. The vacuum wavelength must be greater than 0.9 μm for GaAs and InP substrates and must be greater than 1.1 μm for Si substrates. Given an arrangement wherein light is coupled through the substrate, the electronic and optical coupling can be distributed onto two separate planes or levels. It is also not necessary, in this case, to conduct the light with the waveguides at the edge of the substrate. Greater freedom in the arrangement of the optoelectronic device is, therefore, achieved.

The prerequisite for a separation of the electrical from the optical coupling is that a technology is made available that assures that the light departs the substrate at exactly defined angles. Great losses of optical intensity, however, will occur, and these must be reduced by individual mounting of the individual optoelectronic devices. The advantage mentioned in the offset would, thus, be lost. Since the orientation of the crystal planes is multiply exploited during the manufacturing process of each and every optoelectronic device because the exploited effects depend thereon, the direction perpendicular to the waveguide is available for the definition of the exit angle. The distributed feedback along the waveguide with the assistance of a DBR grating can be employed in order to couple light out in this way. The coupling between an optoelectronic device and an optical fiber, however, is more beneficial when the transverse electromagnetic field distribution of the light beamed out perpendicular to the waveguide is critically defined by the guidance property of the waveguide. In this case, the beam must be deflected at a mirror having an angle of inclination of exactly 45° relative to the waveguide. The demand of high smoothness is also made of this mirror, for example the roughness of the mirror surface must be low in comparison to the wavelength of the radiation. Up to now, mirrors that are extremely smooth in the optical sense have been capable of being realized only on the basis of mirror breaking, as well as dry etching and subsequent wet etching. Since mirror breaking in this direction at an angle of 45° relative to the waveguide is impossible for crystallographically reasons, only etching remains as a possibility. Dry etching is usually possible independent of the crystal orientation, but supplies roughened mirrors so that an after-treatment with an etching step is required. Like breaking, wet etching itself usually only succeeds along crystallographically pronounced planes or respective directions.

After the exit of the light from the substrate, a pronounced widening of the light ray will occur due to refraction phenomena. This is countered in the traditional technology in that a light is focussed by a spherical lens which precedes the optical fiber. The arrangement, therefore, successively comprises the optoelectronic device, a spherical lens and the optical fiber.

The coupling of optical energy in optoelectronic devices generally occurs in the direction of the waveguide on the basis of the optical mirrors that are arranged orthogonically relative thereto. Coupling perpendicular to the waveguides is hereto undertaken with the assistance of a DBR grating on the basis of the distributed feedback or with the assistance of a mirror inclined at 45° relative to the waveguide. In this respect, see the article by Z. L. Liau, J. N. Walpole, L. J. Missaggia and D. E. Mull entitled "GaInAsP/InP buried-heterostructure surface-emitting diode laser with monolithic integrated bifocal microlens" *Appl. Phys. Lett*, Vol. 56, No. 13, Mar. 26, 1990, pp. 1219–1221; the article by Z. L. Liau and J. N. Walpole entitled "Surface-emitting GaInAsP/InP laser with low threshold current and high efficiency", *Appl. Phys. Lett*, Vol. 46, No. 2, Jan. 15, 1985, pp. 115–117; the article by J. N. Walpole entitled "R&D on Surface-Emitting Diode Lasers", *Laser Focus/Electro-Optics*, September 1987, pp. 66–74; the article by H. Saito and Y. Noguchi entitled "A Reflection-Type Surface-Emitting 1.3 μm InGaAsP/InP Laser Array with Microcoated Reflector", *Japn. Journal Appl. Phys.*, Vol. 28, No. 7, July 1989, pp. L1239–L1241; the article by M. Mihara entitled "New Surface-Emitting Laser Diode Connects to Optical Fiber Directly", *JEE, Hi-Tech Report*, June 1989 pp. 74–77; the article by J. P. Donnelly, R. J. Bailey, C. A. Wang, G. A. Simpson, and K. Rauschenbach entitled "Hybrid approach to two-dimensional surface-emitting diode laser arrays", *Appl. Phys. Lett.*, Vol. 53, No. 11, Sep. 12, 1988, pp. 938–940; and an article by K. Iga, F. Koyama and S. Kinoshita entitled "Surface-Emitting Semiconductor Lasers", *IEEE Journ. Quantum Electron.*, Vol. 24, No. 9, September 1988 pp. 1845–1855.

With the exception of the publications by Z. L. Liau et al, the outfeed in these known arrangements does not occur through the substrate. In the cited exception, the volume of the substrate belongs to the resonance space of the laser. The resonance condition of the laser is defined here by a mirror orthogonally vis-a-vis the active waveguide and by the mirroring substrate underside. In order to enable laser operations and, therefore, feed light out, the effective reflection of the substrate underside in this arrangement must be increased by a metal coat that, however, only partially extends over the lens. The metal coat has a round opening in the middle of the lens. The round surface of the integrated lens is achieved by etching a plurality of concentric mesas and by subsequently rounding the mesa steps with the assistance of mass transport.

The mirror inclined at 45° relative to the waveguide is produced in a similar way. For example, see the article by Z. L. Liau and J. N. Walpole.

SUMMARY OF THE INVENTION

The object of the present invention is to specify a simply manufactured structure of an optoelectronic device for outfeed and infeed of radiation that also enables an optimally flexible arrangement with other optical or optoelectronic components. This object is achieved by an optoelectronic device comprising a substrate with first and second opposite surfaces, a waveguide being formed on the first surface, a planar mirror limiting said waveguide in one direction and being inclined at 45° relative to the plane of the waveguide so that radiation guided in the waveguide is reflected into the substrate perpendicular to the one surface of the substrate, and a plano-convex lens being integrated on or in the second surface of the substrate facing away from said waveguide. The lens may be formed directly on the second surface of the substrate or may be formed in a recess that is on the second surface.

In the present invention, the radiation is reflected into the substrate from the waveguide layer at 45°. A plano-convex lens for focussing the radiation is constructed in the material of the substrate on the surface of the substrate lying opposite the waveguide. In the structure of the invention, thus, the lens is integrated into the substrate of the optoelectronic device as a result whereof a work step in the manufacture is displaced in the direction toward planar technology. As a result of the higher refractive index of the III-V semiconductor material compared to quartz, a larger radius of curvature than in the known arrangements occurs for the same focussing effect of the lens.

Other advantages and features of the invention will be readily apparent from the following description of the preferred embodiments, the drawings and claims.

DESCRIPTION OF THE PREFERRED EMBODIMENTS

Figure 1:
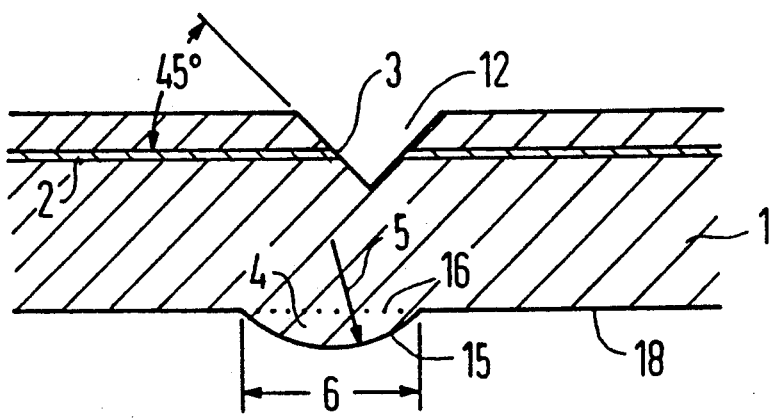
FIG. 1 is a longitudinal cross sectional view of an optoelectronic device according to the present invention.

The principles of the present invention are particularly useful when incorporated into an electronic device illustrated in FIGS. 1, 2, 3 and 4. In the device illustrated in FIG. 1, a substrate 1, for example of InP, has a waveguide 2 disposed on one surface. A V-shaped trench 12 is etched into the one surface of the device and the side walls of the trench 12 limit the waveguide 2 in a longitudinal direction and form a mirror 3 at the end of the waveguide that is inclined at 45° relative to the longitudinal direction of the waveguide 2. A lens 4 is constructed as a component part of the substrate on a second surface 18 of the substrate which lies opposite the surface supporting the waveguide 2. This lens 4 is formed by a convex surface 15 having a radius of curvature 5 which is on an outside of the substrate and by an imaginary, planar boundary surface 16, which is a continuation of the surface 18 of the substrate. A diameter 6 of the lens 4 can vary between 5 $\mu$m and 350 $\mu$m and the radius of curvature 5 will correspondingly vary. The lens is produced by a dry etching method, such as a reactive ion etching (RIE) or a reactive ion beam etching (RIBE). The surface of the lens, for example the convex surface 15, can be anti-reflection coated with a dielectric layer composed of, for example, $Al_2O_3$ or $SiO_2$.

Figure 2:
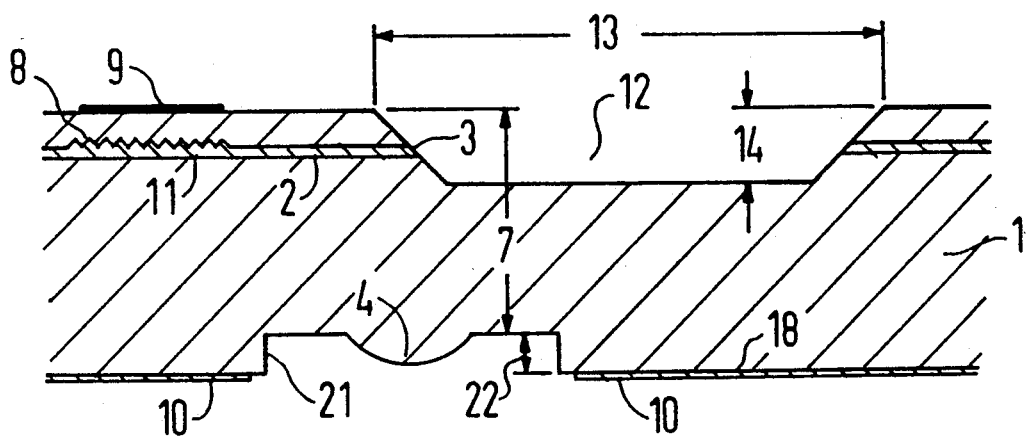
FIG. 2 is a longitudinal cross sectional view of an alternate embodiment of the optoelectronic device in accordance with the present invention.

FIG. 2 shows an arrangement that is an improvement in comparison to the arrangement of FIG. 1. The lens 4 in FIG. 2 is arranged in a recess 21 in the surface 18 of the substrate 1, which surface 18 faces away from the waveguide 2. What is achieved in this way is that the surface of the lens does not project beyond a planar part of the surface 18 of the substrate. Moreover, a spacing 7 can be defined by a depth 22 of the recess 21. The mirror 3 is produced by etching a V-shaped trench 12. This trench is produced by an ion beam etching or by a chemical etching or also by an ion beam etching followed by a wet chemical etching. The employment of a reactive ion beam etching in an oblique incident direction is also possible and the substrate can be tilted in order to achieve the required instant angle. The shape obtained is shown in FIG. 2, whereby the width 13 of the trench 12 is greater than the depth 14 of the trench and itself lies between 1 $\mu$m and 5 $\mu$m. The spacing 7 will amount to 20 $\mu$m through 200 $\mu$m and the thickness of the substrate 1 is less than 200 $\mu$m. In the present exemplary embodiment, an active zone 11 is provided in the waveguide 2, a current is capable of being applied into this active zone 11 via being entered into contacts 9 and 10. A DFB grating 8 is present for the excitation of the laser emission. The emission produced in this DFB laser is outfed through the substrate via the mirror 3. A receiver that detects the light transmitted by this arrangement can be coupled to the waveguide 2. The light can be fed into another arrangement of the invention.

Figure 3:
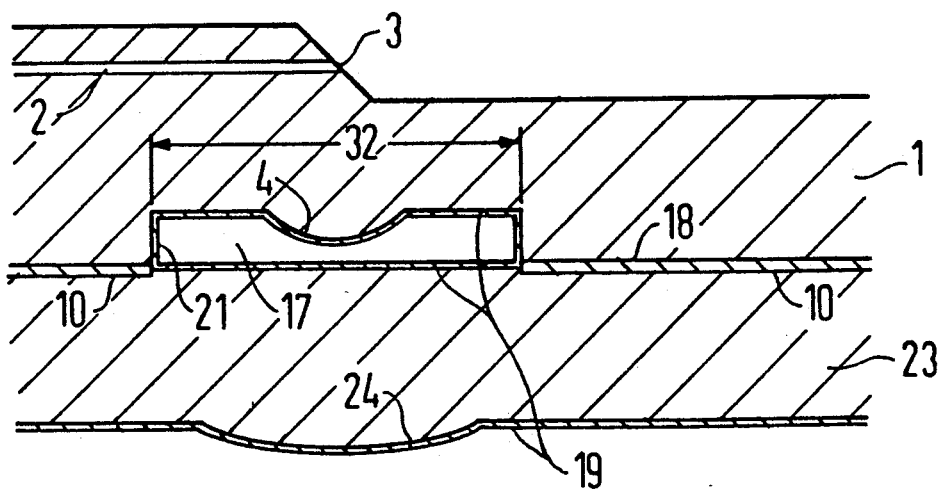
FIG. 3 is a longitudinal cross sectional view of the arrangement of the optoelectronic device of the present invention expanded onto a second substrate.

FIG. 3 shows another exemplary embodiment wherein the optoelectronic device is arranged on a further or additional substrate, referred to below as a "second substrate" or "sub-substrate". This second or sub-substrate 23 can be composed, for example, of silicon. The surface of the second substrate 23 can be planar or can also contain, in addition, an integrated plano-convex lens. The manufacture of these lenses occurs correspondingly, as in the case of III-V materials, however different etching gases must be employed. A lens 24 that is integrated in the sub-substrate can either be present at the side facing away from the first substrate 1, as shown in FIG. 3, or on the side facing toward the substrate 1, or on both sides. In FIG. 3, the substrate 1 has a recess 21, as in FIG. 2. A diameter 32 of this recess is approximately 50 $\mu$m larger than the diameter 6 of the lens. The surface of the substrate 1 and of the sub-substrate 23 are provided with anti-reflection coats 19, which is also present in the recess 21. The interspace 17 can be filled, for example, with a reflection-reducing material. The interspace 17 can also simply contain air. The surface of the substrate 23 provided with the lens 24 and facing away from the substrate 1 is, likewise, covered with an anti-reflection coating 19.

Figure 4:
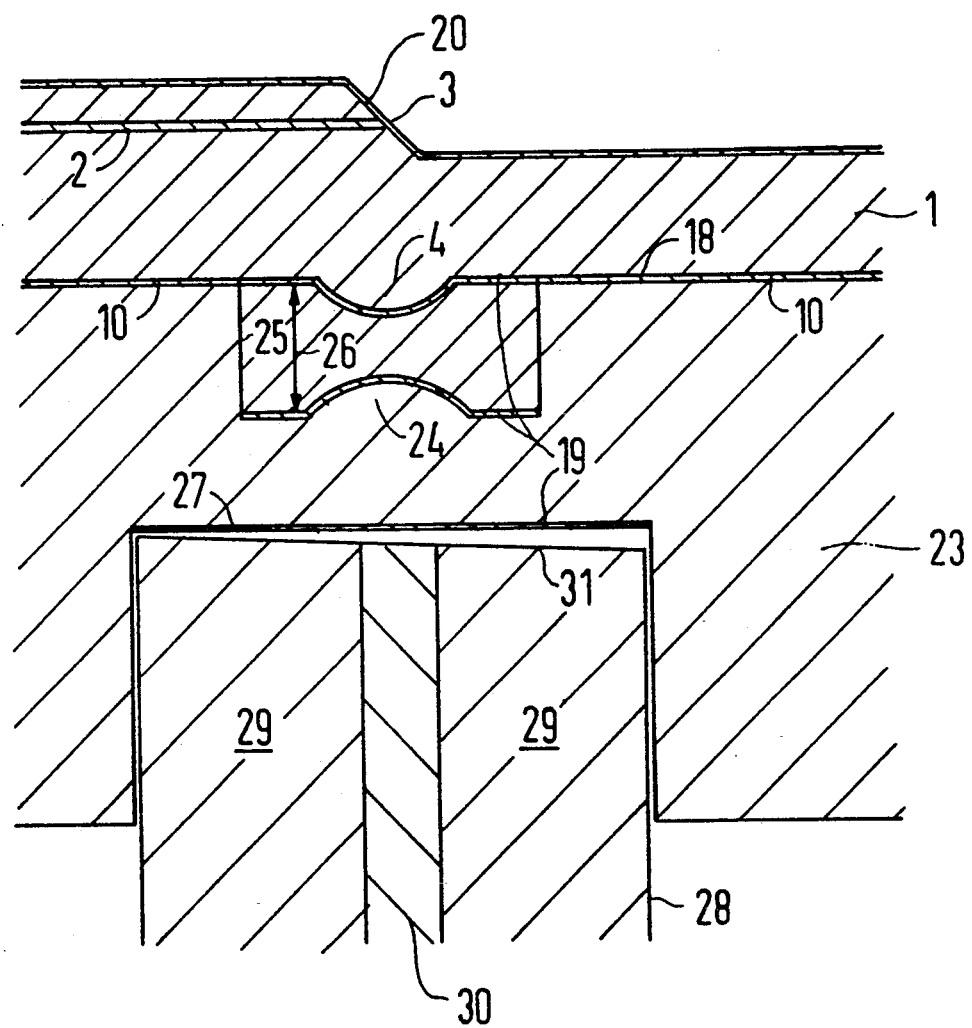
FIG. 4 is a longitudinal cross sectional view of an alternate arrangement of the device of FIG. 3 showing a coupling for optical waveguide fibers.

An optical fiber 28 (see FIG. 4), whose end face can be perpendicular or oblique vis-a-vis the beam direction, can be fitted onto the substrate 23. In FIG. 4, a lens 24 is provided in a recess 25 of the second sub-substrate 23. A depth 26 of the recess 25 is dimensioned adequately large for the presence of both a lens 4 for the substrate 1 and the lens 24 of the second substrate 23. A dielectric protective layer 20 is situated on an overgrown upper side of the substrate 1. The lenses 4 and 24 are provided with anti-reflection coatings 19. A recess for the acceptance of the optical fiber 28 is present on a side of the second substrate 23 which faces away from the substrate 1. This recess forms a coupling region 27 for the fiber and is, likewise, covered with an anti-reflection coating 19. The fiber is composed of a fiber cladding 29 and a fiber core 30, which are positioned in the extension of the beam path of the light emitted from the substrate 1. The end face of the optical fiber 28 can lie to extend perpendicularly or obliquely relative to the beam direction. A taper-like shape is also possible for the end of the optical fiber, for example the end face is pre-arced lens-like or conically tapered to a point.

An exact, geometrical, for example particular optical matching of the mirror 3, the lens 4 in the substrate 1 and of the optical fiber 28 is possible on the basis of a reproducible etching technique, potentially via additional lenses 24 built into the substrate 23. One adjustment process suffices during manufacture for a plurality of identical arrangements of the invention arranged on a wafer. The devices can then be subsequently detached from one another.

The inventive structure of the optoelectronic device particularly has the following advantages: A DFB grating or a DBR grating can be employed. No mirrors of the Fabry-Perot type that limit the resonance of the waveguide are, therefore, required. A separate mirroring of the mirror 3 effecting the reflection of the radiation by 45° is, likewise, not required. The sole condition is that a total reflection at 45° occurs at this end face of the waveguide. The manufacture of the mirror 3 on the basis of wet etching can be implemented in a simple way and produces extremely smooth surfaces so that no deterioration of the distant field behavior occurs.

The optoelectronic device can be constructed on a carrier of silicon. This will open up the possibility of utilizing an achromatic lens system.

The manufacture of the integrated, convex lens in planar technology reproducibly succeeds on the basis of dry etching and is a non-critical method. Over and above this, it is also possible to countersink and, thus, to protect the lens in a recess on the substrate.

Although various minor modifications may be suggested by those versed in the art, it should be understood that we wish to embody within the scope of the patent granted hereon all such modifications as reasonably and properly come within the scope of our contribution to the art.

We claim:

1. An optoelectronic device comprising a substrate having a first and second surface, a waveguide being disposed on a first surface of the substrate, said waveguide including an active zone for generating a laser emission, said substrate having contacts for applying a current to the active zone, said active zone including a grating selected from a DBR grating and a DFB grating, a planar mirror limiting the waveguide in one direction and being inclined at 45° relative to the waveguide so that radiation guided in the waveguide is reflected into the substrate perpendicular to one surface of the substrate, and a plano-convex lens being integrated onto the second surface of the substrate, which faces away from said waveguide.

2. An optoelectronic device according to claim 1, wherein the second surface has a recess having a depth corresponding to the thickness of the lens and said lens is disposed on a base of said recess.

3. An optoelectronic device according to claim 2, wherein the second surface of the substrate is secured on a second substrate.

4. An optoelectronic device according to claim 3, wherein the first-mentioned substrate is composed of a III-V material and the second substrate is composed of silicon.

5. An optoelectronic device according to claim 3, wherein a second lens is formed on a surface of the second substrate facing away from the first-mentioned substrate.

6. An optoelectronic device according to claim 3, wherein a surface of the second substrate facing toward the first-mentioned substrate has a recess in the region of the lens.

7. An optoelectronic device according to claim 3, wherein a coupling region for connection of an optical fiber is provided in a surface of the second substrate, which surface is facing away from the first-mentioned substrate.

8. An optoelectronic device according to claim 1, wherein the device is formed on a common chip with other devices.

9. An optoelectronic device according to claim 1, which includes a second substrate with a third surface, said second surface being secured on said third surface of said second substrate, and one of the second and third surfaces having a recess aligned with said lens.

10. An optoelectronic device according to claim 9, wherein the second substrate is composed of silicon and the first-mentioned substrate is composed of a III-V material.

11. An optoelectronic device according to claim 9, wherein a second lens aligned with the first-mentioned lens is integrated on the second substrate on the third surface.

12. An optoelectronic device according to claim 9, wherein the third surface of the second substrate has said recess.

13. An optoelectronic device according to claim 9, wherein the second substrate on a surface facing away from the first substrate includes a coupling region for connection of an optical fiber.

14. An optoelectronic device according to claim 13, wherein said coupling region is formed by a recess receiving an end of said optical fiber.

15. An optoelectronic device according to claim 1, wherein said grating is a DBR grating.

16. An optoelectronic device according to claim 1, wherein said grating is a DFB grating.

17. An optoelectronic device comprising a first substrate having first and second surfaces, a waveguide being disposed on the first surface of the first substrate, a planar mirror limiting said waveguide in one direction and being inclined at an angle of 45° relative to said waveguide to deflect radiation guided in the waveguide into the substrate perpendicular to the first surface of the substrate, a second substrate having a third surface secured to the second surface of the first substrate, one of said second and third surfaces being provided with a recess in a region aligned with the radiation guided by said mirror into the substrate, said first substrate having a lens received in said recess and said second substrate having a second lens aligned with the first lens.

18. An optoelectronic device according to claim 17, wherein the recess is disposed in said second surface and said second lens is disposed on a fourth surface facing away from said second and third surfaces.

19. An optoelectronic device according to claim 17, wherein said third surface of the second substrate has said recess receiving the first lens with the second lens being disposed in a base of said recess, said second substrate having a recess on a surface opposite the third surface being aligned with said lenses and receiving an optical fiber for receiving light focussed by said lenses.

20. An optoelectronic device according to claim 17, wherein the waveguide has an active zone for generating a laser emission, said first substrate having contacts for applying a current to said active zone, said active zone including a grating selected from a DBR grating and a DFB grating.

* * * * *